(12) United States Patent
Neale et al.

(10) Patent No.: US 6,201,619 B1
(45) Date of Patent: Mar. 13, 2001

(54) AUTOFOCUS PROCESS AND SYSTEM WITH FAST MULTI-REGION SAMPLING

(75) Inventors: Timothy E. Neale, Hampstead, NH (US); Richard J. Strazdas, Westford, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/099,158

(22) Filed: Jun. 18, 1998

(51) Int. Cl.$^7$ ....................................................... H04N 1/46
(52) U.S. Cl. ......................... 358/505; 358/509; 358/474; 358/475; 358/487; 358/488; 358/497
(58) Field of Search ..................................... 358/487, 497, 358/488, 486, 505, 406, 475, 509; 250/201.7, 201.2; 348/345, 96

(56) References Cited

U.S. PATENT DOCUMENTS

| | | | |
|---|---|---|---|
| 5,365,053 | 11/1994 | Schielke et al. | 250/201.7 |
| 5,430,288 | 7/1995 | Schielke et al. | 250/201.7 |
| 5,532,846 | * 7/1996 | Brook et al. | 358/497 |
| 5,767,989 | * 6/1998 | Sakaguchi | 358/474 |

* cited by examiner

Primary Examiner—Cheukfan Lee
(74) Attorney, Agent, or Firm—J. Grant Houston; Robert A. Sabourin

(57) ABSTRACT

An autofocus process for imaging optics of a scanner comprises performing multiple scan-line image captures of the document to be scanned. In the preferred embodiment, these captures are of essentially the same scan-line. A focal position of imaging optics, which forms a scan-line image, is adjusted relative to an image detector in between the multiple scan-line captures of image data. In the preferred embodiment, the imaging optics is adjusted. Relay optics or a position of the image detector could alternatively be adjusted. In any case, a focus setting for a subsequent scanning operation is then calculated based on the image data from the multiple scan-line captures. In the preferred embodiment, this calculation yields a lens position for the imaging optics. The invention thus allows autofocussing to the document to be scanned. Problems associated with loss of calibration are avoided. Moreover, the system is able to adapt to documents where the image is not at the scanner's nominal focal plane.

12 Claims, 10 Drawing Sheets

AUTOFOCUS PROCESS AND SYSTEM WITH FAST MULTI-REGION SAMPLING

BACKGROUND OF THE INVENTION

Digital scanners are used to digitize the graphic content, be it color or black and white photographs, artwork, text, and other graphics, from reflective and/or transmissive original documents. This capability is useful in digital document storage, digital content generation, and in more industrial pre-process environments. In this latter application, chemical film-based photographs, for example, can be digitally scanned for pre-print review, followed by production printing.

One of the most common scanner configurations is the flatbed scanner. A transmissive or reflective original document is placed face down on a bed having a glass plate or in a slide tray. A carriage, under the glass plate having a slit aperture facing the document, is then scanned over the original document. A relay optical system in the carriage successively picks-off scan-lines. In the one configuration, a single fold mirror is used in a high-resolution mode, and a series of larger fold mirrors are used in a low-resolution mode. In either case, the fold mirror(s) relay the scanned lines to high/low resolution in the optical imaging system, which images the scan-lines onto a linear or two dimensional image detector, such as a trilinear charge-coupled device (CCD) array or CMOS-based image detector.

Although speed of scanning, for example, is an important capability, one of the major factors in distinguishing scanners is resolution, or the fineness of the detail that the scanner can digitize. Consumer-grade scanners are offered with optical resolutions approaching 600 dots per inch (dpi). Currently, commercial-grade scanners are offered with resolutions of greater than 1,000 dpi, in standard resolution modes. Generally, the increases in resolution are related to the size and levels of integration in the image detectors.

Optical resolution, however, is not increased simply by increasing the density of or number of elements in the image detector since a precision optical imaging system is required to form the image of a scan-line, for example, from the document on the image detector, and its focus must be correct. In the prior art, the scanner's optical imaging system was calibrated in the factory or during a hardware setup procedure associated with a particular document holding device, such as a slide tray for example. A predetermined image was sent through the optical imaging system and received by the image detector. The data from the image detector was then analyzed while adjusting the optical imaging system to obtain the best focus. This best focus position was then stored for all subsequent scanning operations.

SUMMARY OF THE INVENTION

The problem with the conventional technique is that it fails to account for two problems. First, the scanner may slowly move out of calibration with aging and environmental effects such as shock exposure. Secondly, the optimum focus position for the optical imaging system may be dependent upon the particular original document being scanned. Typically, the calibrated object plane corresponds to the top surface of the glass plate on the scanner's bed. When transparency material is being scanned and its image is removed from the glass plate's top surface, the ideal object plane differs from that used during calibration. A similar problem occurs with mounted slides, for example, where the image does not reside at a predictable position.

To confront these problems, the invention thus allows autofocussing of the document to be scanned. Problems associated with loss of calibration are avoided. Moreover, the system is able to adapt to documents where the image is not at the scanner's nominal focal plane.

In general according to one aspect, the invention features an autofocus process for imaging optics of an image acquisition device such as a scanner. The same principles of the invention apply to capturing a section of an image with an area array detector and using that information for making autofocussing decisions, rather than the information obtained from individual scan lines. The process comprises performing multiple image captures of the document to be imaged. In the preferred embodiment, these captures are of essentially the same region (e.g. area or line) of the document.

A focal position of imaging optics, which forms the image, is adjusted relative to an image detector in between the multiple captures of image data. In the preferred embodiment, the imaging optics is adjusted. Relay optics or a position of the image detector could alternatively be adjusted.

In any case, a focus setting for a subsequent imaging operation is then calculated based on the image data from the multiple captures. In the preferred embodiment, this calculation yields a lens position for the imaging optics.

In the preferred embodiment, the image scan-line or area captures are treated as a single image capture from the perspective of the hardware. The image detector electronics need to only be prepared for a single imaging operation.

Also, the image data should be analyzed to determine whether it is indicative of a focus prior to the calculation of the focus setting. The analysis can be for one or each primary color. If no data set is indicative of focus, a stored best focus setting is retrieved and the imaging optics and/or image detector is adjusted as based on the stored best focus setting. Further, corrections for magnification changes caused by adjustment in a focal position of the imaging optics should be made between separate image captures.

In the preferred embodiment, image data groups from multiple analysis regions of the image captures are used. This allows the generation of a focus setting based on more than one point in the document, but magnification changes caused by adjustment in the focal position of the imaging optics should be addressed.

In general, according to another aspect, the invention also features an image acquisition device having an autofocus capability. The device comprises an image detector that generates image data descriptive of a scan-line or region of the document (i.e. the image to be acquired). Imaging optics are used to form an image on the image detector, and relay optics picks-off the image from media being acquired. A focus actuator adjusts a focal position of imaging optics relative to the image detector under control of a control system. The system modulates the focus actuator based on the image data from multiple image captures of the same scan-line or area.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE PREFERRED EMBODIMENTS

Figure 1:
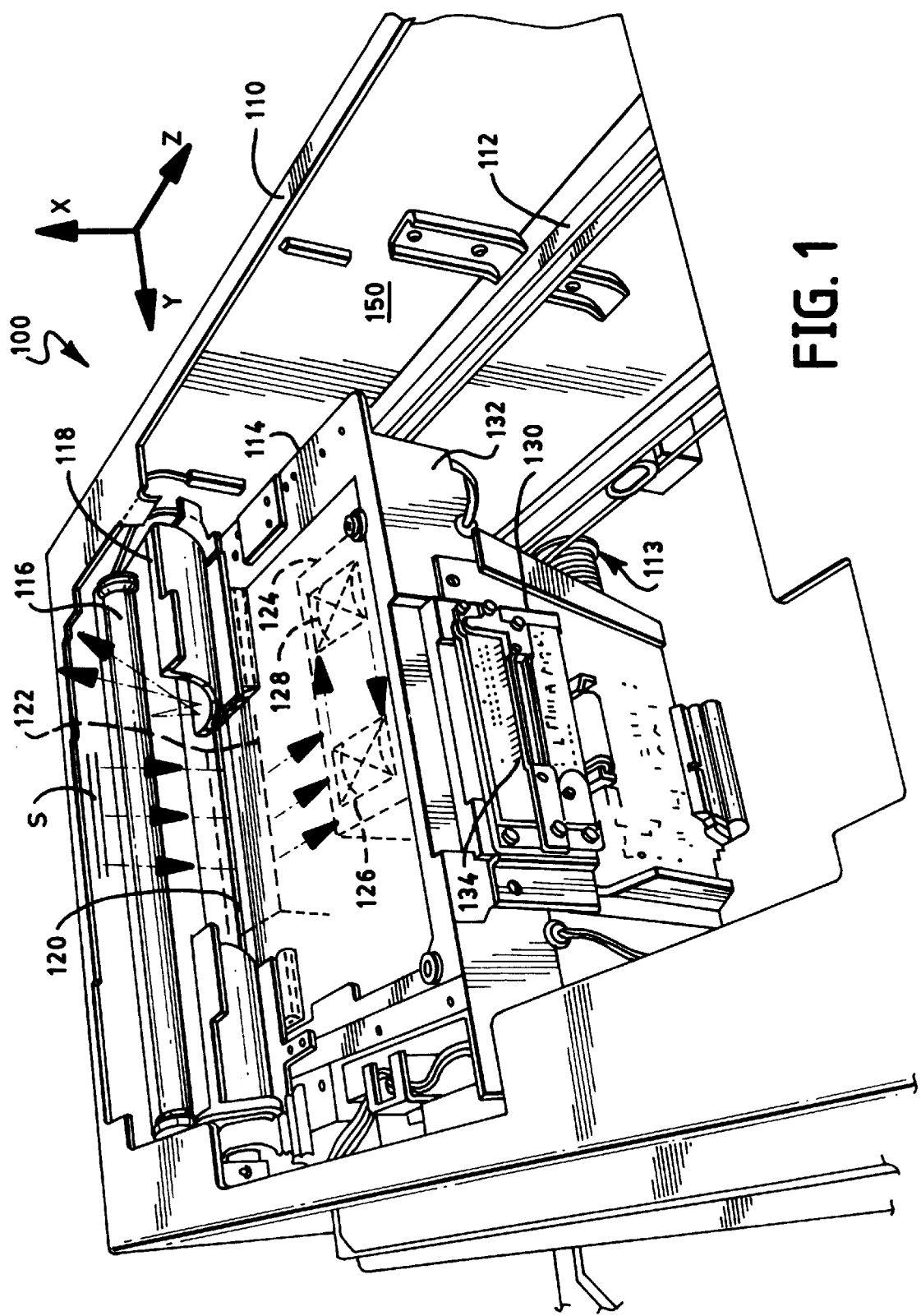
FIG. 1 is a perspective view of a flatbed scanner incorporating the present invention.

FIG. 1 shows the main components of a flatbed scanner 100 to which an embodiment of the present invention is applied.

Generally, the scanner 100 comprises a housing or frame 110. Secured to the housing 110 and extending longitudinally or in the direction parallel to the z-axis are two rails 112. Only the right rail is actually shown due to the perspective. These rails 112 support an optical system carriage 114 that scans or travels in the z-axis under control of a wire-drive system 113 beneath glass plate 150.

An illuminator 116 is installed on the carriage 114. Preferably, a reflector system 118 is used to concentrate light from the illuminator 116 on the original document to be scanned. In the preferred embodiment, the reflectors are movable between two positions depending upon whether or not a reflective or transmissive original is being scanned. In either case, light from the scanned lines or regions s passes into the carriage through a slit aperture 120. Housed within the carriage 114 are a relay optical system 122 and imaging optical system 124. In the preferred embodiment, two imaging lens systems 126, 128 are provided. They are movable alternatively into the optical path to provide for high or low resolution scanning.

An image detector module 130 is secured to the front face 132 of the carriage 114. This module 130 carries the image detector 134.

Figure 2:
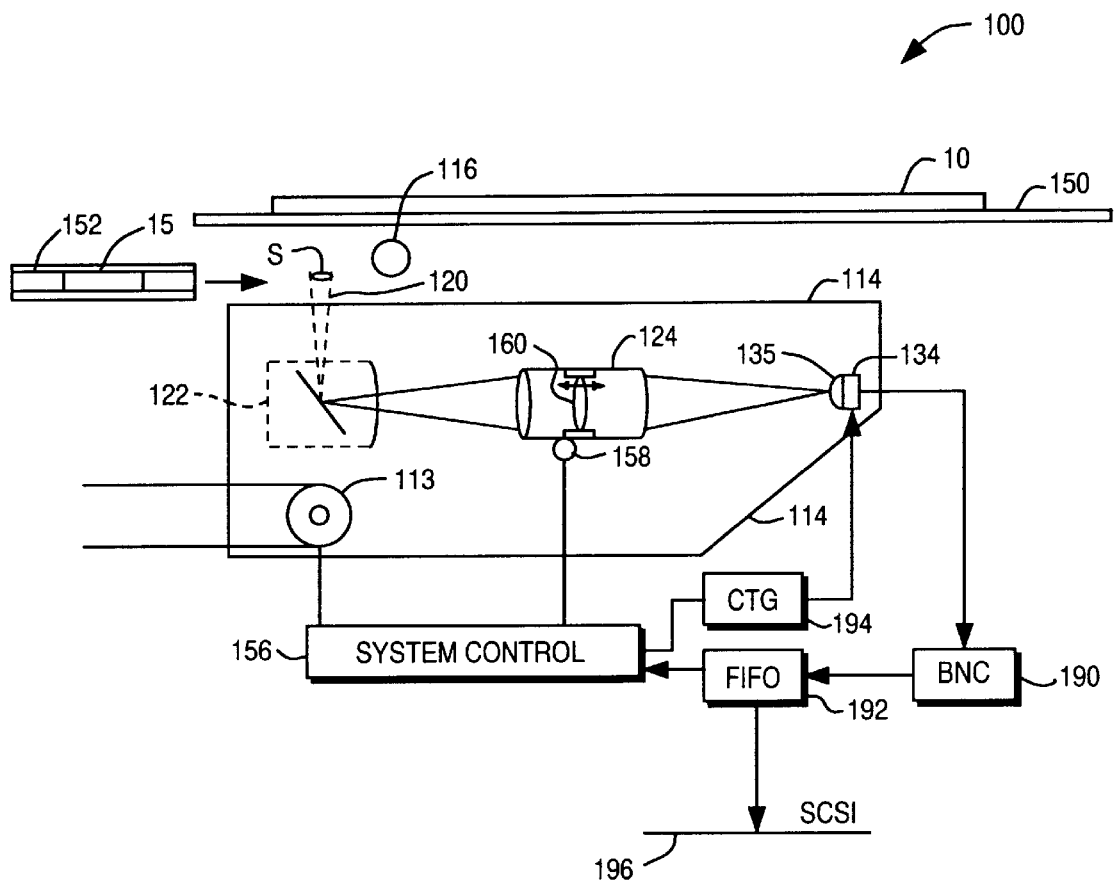
FIG. 2 is a schematic, side plan view illustrating the relationship between the optical system, carriage, and objective planes of a flat bed scanner to which the present invention applies.

FIG. 2 illustrates the relationship between the optical systems, the carriage, and objective planes of the flat bed scanner 100. Specifically, the relay optical system 122 picks-off scan-lines from an original document through slit aperture 120. This occurs in one of two modes in the illustrated embodiment.

In opaque document scanning, the original document 10 is placed face down on glass plate 150. Light from the illuminator 116 reflects from the document and through aperture 120. In transmissive document scanning, a slide or film negative is installed on slide holder 152 and inserted into the scanner, between the illuminator 116 and carriage 114. Light from the illuminator passes through the document 15 and into the aperture 120.

The relay optics 122 is illustrated as comprising a single fold mirror. In the preferred embodiment, this single fold mirror is used in a high-resolution mode. A series of larger fold mirrors can be used in a low-resolution mode to redirect the image of the scan-line s to imaging optics 124.

The imaging optics 124 form an image of the scan-lines on the image detector 134, which is preferably a tri-linear CCD (charge-coupled device) image detector. Such tri-linear image detectors have three rows of pixel elements 135. Each row has a different associated primary color filter: red, green, or blue, which enables simultaneous detection of the three primary colors in the scan-line, without a color wheel. Image data from the image detector 134 passes through a black/white correction unit 190 to a first-in-first-out buffer 192, which sends the image data out onto a SCSI (small computer system interface) bus 196, in one embodiment.

In alternative implementations, the linear CCD is replaced with a CCD or other type of area detector to enable scanning of two dimensional, as opposed to one-dimensional, regions of the document. In some cases, this can be used to increase the speed of scanning.

A control system 156 is used to control the overall operation of the scanner 100. Most relevant here is the fact that the control system operates a focusing actuator 158, which is used to translate a focusing lens 160 in the optical imaging system 124. In a preferred embodiment, the focus actuator 158 is a stepper motor. With the proper adjustment of the position of the focusing lens 160 by the focusing actuator, images of the scan-lines are formed on the three pixel-element-arrays 135 of the image detector 134. Additionally, the control system also receives the image data generated by the image detector 134 and controls the carriage drive 113.

Figure 3A:
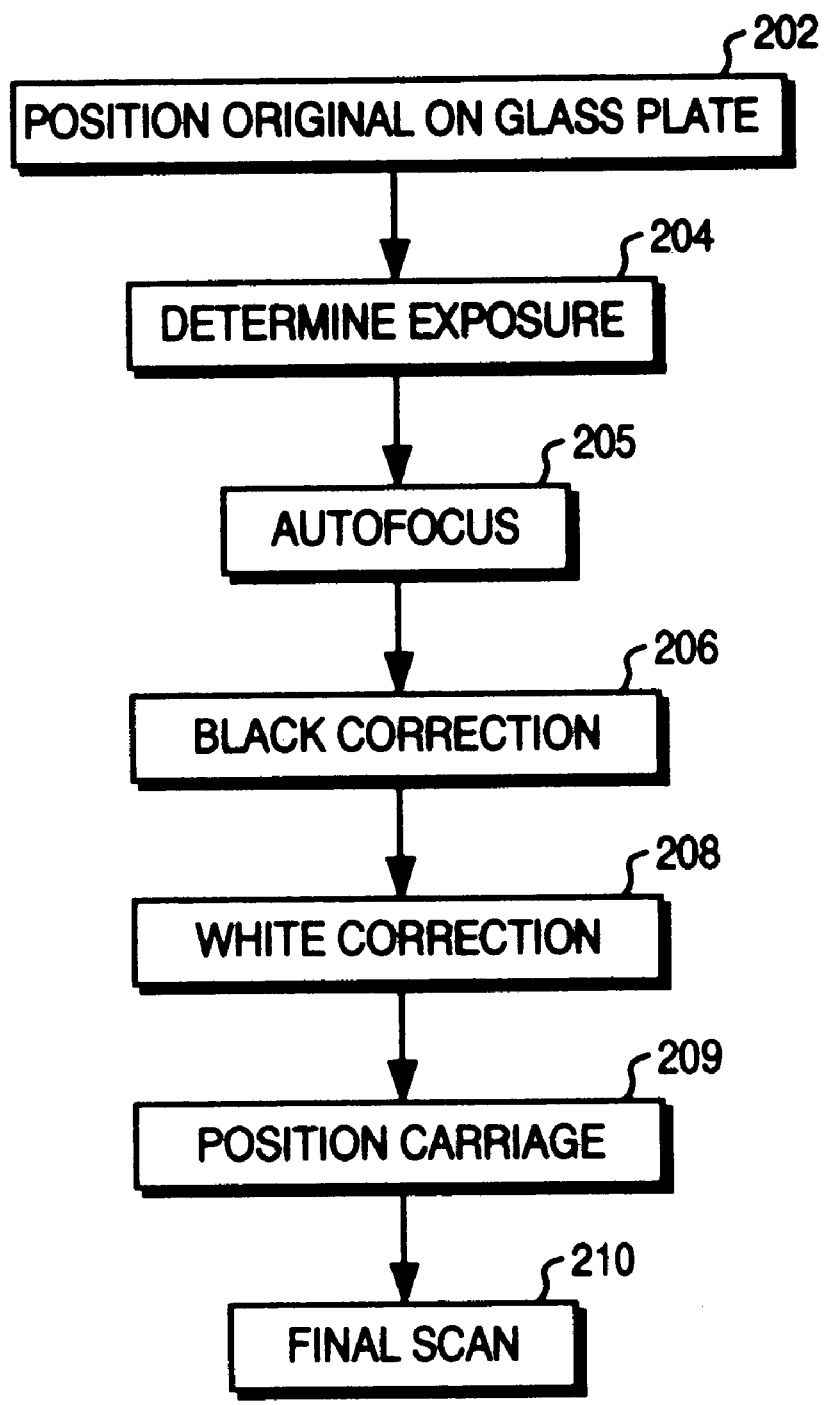
FIG. 3A is a flow diagram illustrating the steps performed in a scanning operation according to the invention.

FIG. 3A shows a scanning operation based on the principles of the present invention. In step 202, the original document 10 or 15, which is to be scanned, is placed on the glass plate 150 or in the tray 152, respectively, and inserted into the scanner. The implication of this step is that auto focusing is performed to the document itself and not based upon a fixed or predetermined image plane, as is conventional in factory calibration procedures. As a result, if the original document is a transparency, in which the image is on a rear surface of the transparent media for example, or if the image to be scanned is in some other way removed from the nominal image plane, the present invention will automatically adapt the image plane to the location of the image to be scanned.

Notwithstanding step 202, in other embodiments, a target image could be generated based on a nominal image plane to be used in the auto focusing process. This approach could be used to realize many of the other advantages of the invention.

In step 204, the system controller 156 programs a CCD timing generator (CTG) 194. This enables the CTG 194 to generate control signals to operate the CCD image detector 134. These control signals dictate the exposure time and the shifting-out of the image data from the image detector 134. The optimal exposure time is a function of parameters such as available light in the scanner, scan characteristics (color/ monotone, speed/quality, dpi), and other factors. The system controller 156, and particularly firmware, computes the exposure time and resultant line time, which is the time for all three color exposures plus the time to shift data out of the CCD. The firmware then programs the CTG 194 to produce the required control signals. As a result, image data produced by the CCD for one exposure is shifted out while another exposure is taking place. In this way, a new line of image data can be acquired every line time.

The auto focussing is performed in step 205 according to the invention. Black and white corrections (BWC) are performed in steps 206 and 208. Then, the carriage is moved to its start position, such as the beginning of the crop area in step 209, and the final scan takes place in step 210. In the final scan, the image data is transferred through BWC unit 190 and FIFO (first-in, first-out) register 192 to a host computer over the SCSI bus 196.

Figure 3B:
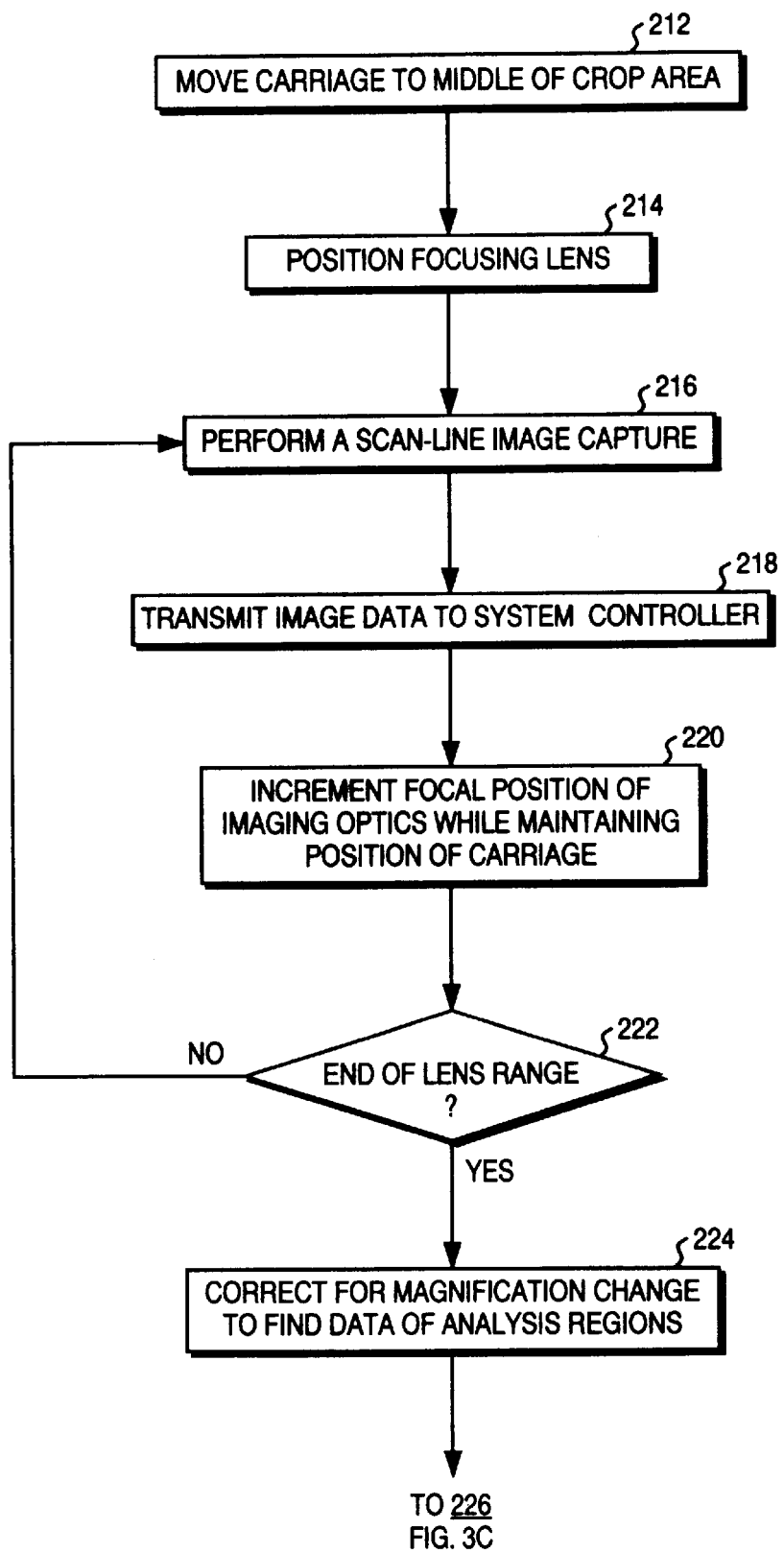
FIGS. 3B and 3C a flow diagram illustrating the steps performed in an auto focus process according to the present invention.
Figure 3C:
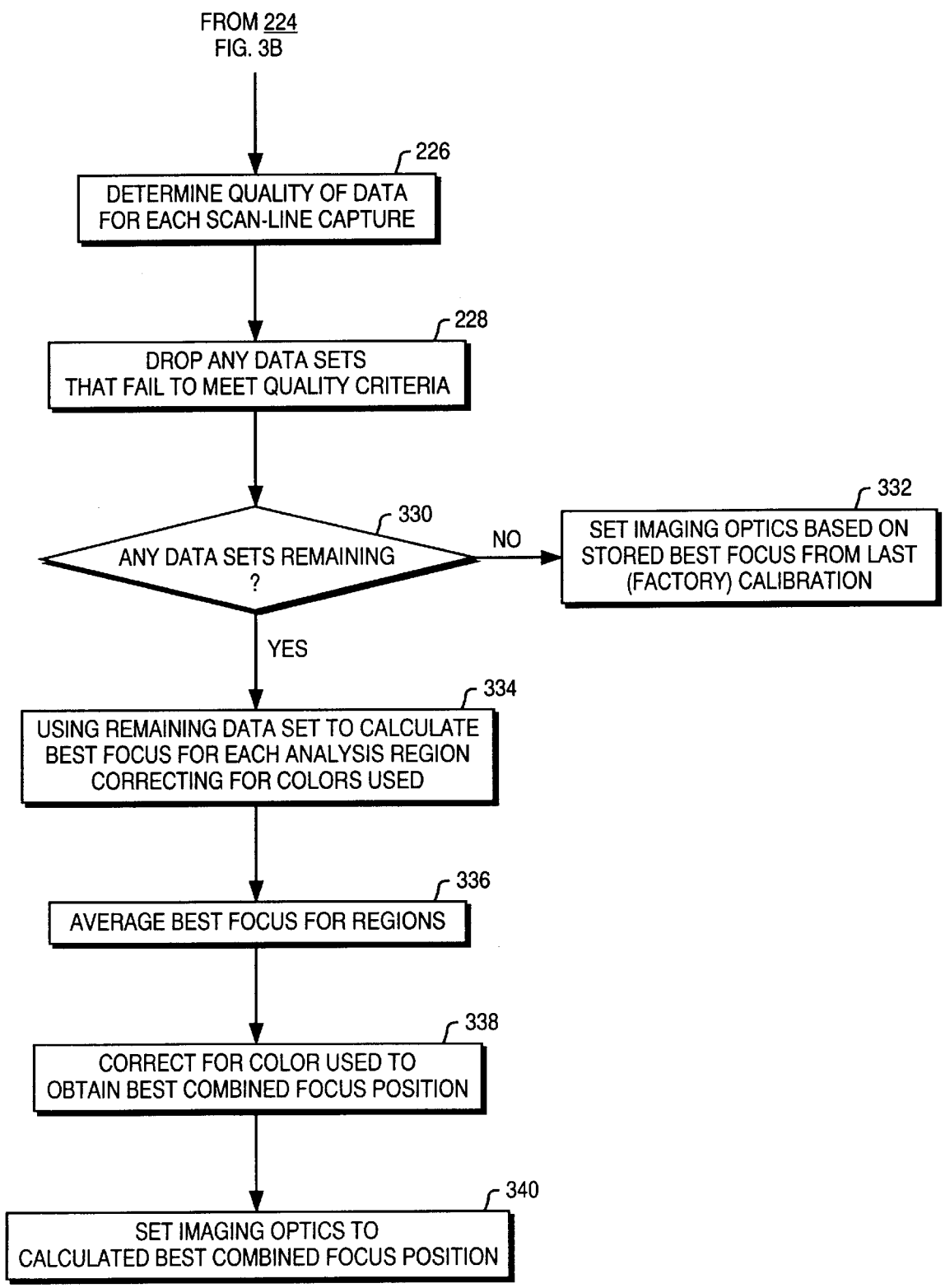

FIG. 3B illustrates the auto focus process corresponding to step 205 according to the invention.

In step 212, the control system 156 moves the carriage 114 so that the slit aperture 112 is placed in the center of the crop area of the original document to begin the auto focus process. The crop area is the portion of the document that is to be digitized.

Figure 4:
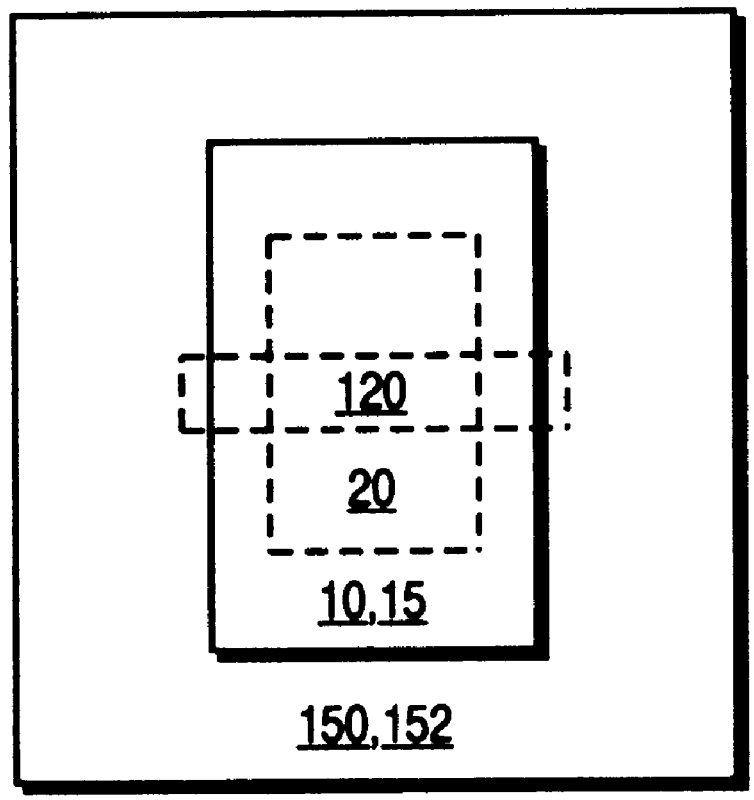
FIG. 4 is a top plan view showing the relationship between the slit aperture and the crop area of the document to be scanned during auto focus.

FIG. 4 shows the positioning of the slit aperture 120 relative to the crop area 20 of the document 10 or 15 to be scanned. In most cases, the center of the crop area 20 is a good reference for the auto focusing. If there is any difference in the height of the image on the document to be scanned 10, the center of the crop area should provide a good representative height.

Returning to FIG. 3B, in step 214, the focusing actuator moves the focusing lens 160 to a predetermined position. In one embodiment, the lens 160 is moved to an extreme end of its range of adjustment.

Beginning at step 216, the image capturing process is begun for autofocus processing. Specifically, a scan-line image is captured in step 216, in the preferred embodiment, and transmitted to the system controller in step 218. Then the position of the focusing lens 160 is incremented, in step 220, by the system controller 156 by control of the focus actuator 158. The total adjustment range of the focusing lens 128 by the focusing actuator 126 is 0.3 inches.

In the preferred embodiment of the auto focus process, the lens 160 is incrementally moved across its range of motion (e.g. 300 possible positions) in increments of one or more steps. If more than one step is done per increment, then interpolation will be used to determine the best position. The advantage of multiple step moves is that it allows settling time between moves without extending overall focus time.

The scan carriage 114 is held in a stationary position. This maintains the slit aperture 120 in the center of the crop area 20. Thus, substantially the same scan-line is picked off by the relay optics 122 and sent to the image detector 134 through imaging optics 124. Only minor differences caused by magnification changes due to the lens movement change the extent of the scan-line sent to the image detector 134. This strategy allows a direct comparison of the data from successive scan-line captures to determine which data set represents a lens position with the best focus.

Data from the successive scan-line captures is transmitted to the system controller 156. This is repeated until the lens 160 reaches the end of its range of movement as determined in step 222.

In alternative embodiments, the data is analyzed as it is received to search for a peak in the quality of focus. If focus quality increases and then decreases as the lens is adjusted in one direction, the rest of the readings for this pass are not required. This approach could be used to avoid translation of the lens 160 across its complete range of movement, but certain assumptions in the shape of the focus quality curve are required.

In still another alternative embodiment, a hunting algorithm is used to find the peak. A number of measurements are taken at widely spaced lens positions, with the peak focus quality assumed between the two highest readings. Another group of measures is then taken, but this time at closer spacings and in between the two peak readings. This process is repeated each time but with more closely spaced measurements until the measurements are being taken over a very small area within the smallest possible resolution. The position with the highest reading for this last pass is determined to be the best focus position.

In the past, separate scan-line captures in factory or calibration focusing routines were treated as separate scans even though the resultant image only consisted of one scan-line. The problem with this approach is the overhead associated with setting-up the CTG 194. Further, typically eight line times worth of synchronizing exposures is discarded in any scan. Moreover, there are pipeline delays. Thus, delays total 2 to 20 milliseconds, which result in significant delays when hundreds of separate scan-line captures are performed with delays associated with the intervening mechanical adjustments.

In the preferred embodiment, during the auto focus process, scan-line image captures are performed for the entire range of the focus lens 160. In the preferred embodiment, this translates to up to three hundred separate scan-line captures depending on the number of positions incremented with each scan-line, but the captures are treated as a single scan from the perspective of the hardware. The difference relative to the final scan is that the carriage is not moved, but the focusing lens is moved. Moreover, the data is received by the system controller 156.

In step 224, the data of each scan-line capture is corrected for magnification changes due to the corresponding changes in the focusing lens position.

Figure 5:
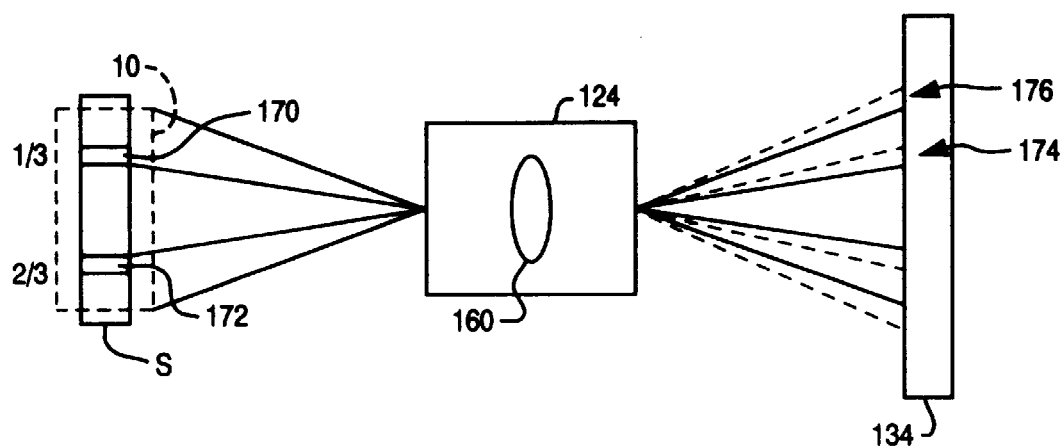
FIG. 5 is a side plan view showing the changes in the location of the analysis regions on the image detector caused by imaging lens movement.

As shown in FIG. 5, in a given scan-line image s two analysis regions 170, 172 are defined, preferably spaced at ⅓ and ⅔ the distance across the length of the crop area 10. These regions define the image data that are used for auto focussing.

The changes in the lens position cause the imaging optics 124 to have different effective magnifications from the perspective of the image detector 134. As the lens is moved by the actuator 158, magnification increases so that analysis region 170, for example are detected by pixel elements 174 for one scan-line capture and pixel elements 176 for a later scan-line capture.

Figure 6:
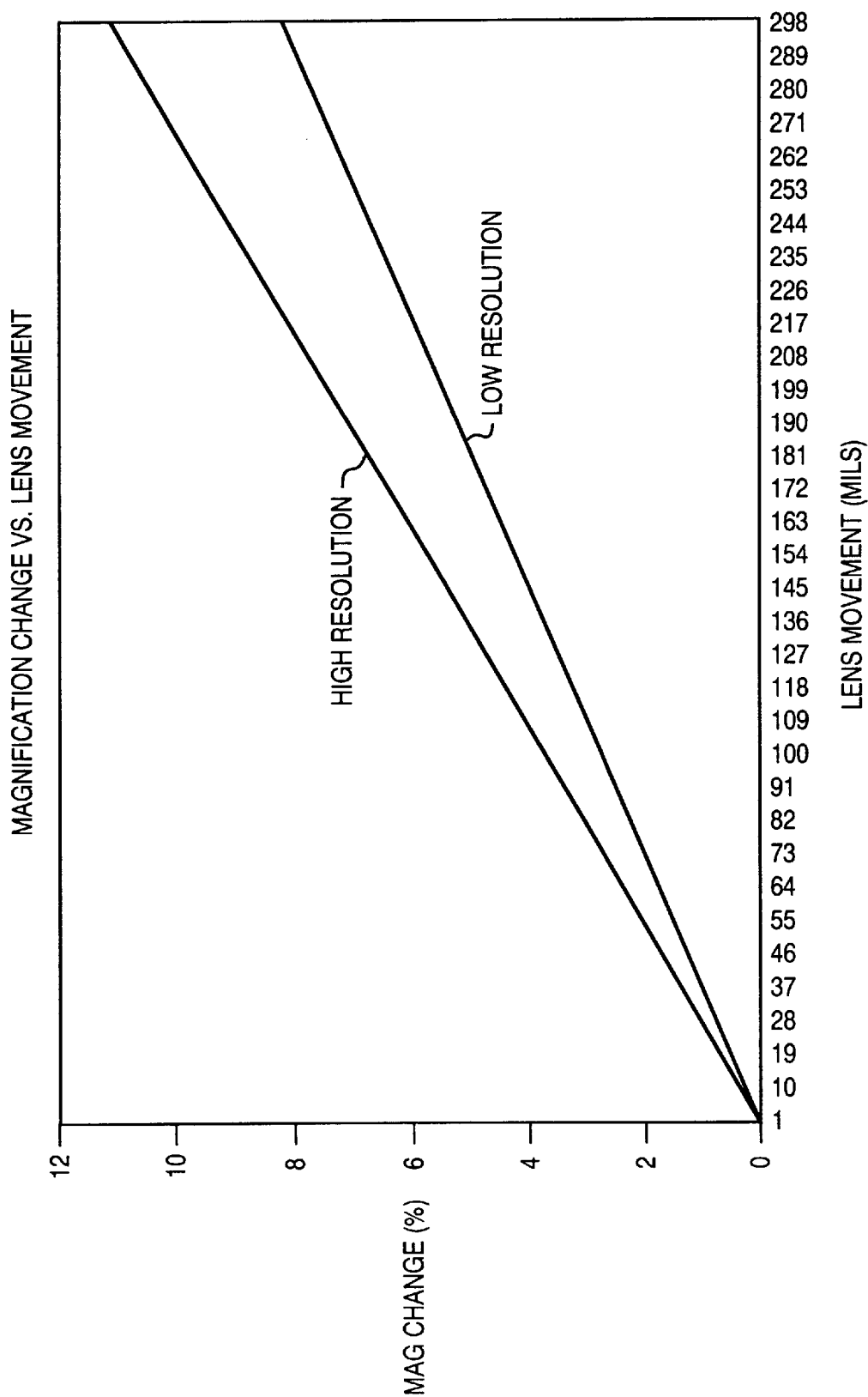
FIG. 6 is a plot of magnification change as a function of imaging lens position.

FIG. 6 illustrates that for the low-resolution mode, there is an 8% magnification change across the range of the lens movements. In the high-resolution mode, there is an almost 12% change in magnification across the range of lens movement.

The relationships between lens position and magnification expressed in FIG. 6 are utilized in step 224 of FIG. 3B to find the groups of image data in each of the scan-line captures that describes the analysis regions of the scan-line s. In the preferred embodiment, the analysis regions 170, 172 correspond to 200 pixel wide groups of image data for each region. The remaining data can be discarded. In one implementation issue, there may be separate analog processing for odd and even pixels in some systems. One solution to this problem is to only use odd or even pixels, thus, avoiding any normalization problems between the two sets of pixels.

The advantage of auto focusing based on multiple regions in the document is that it provides a better indication of focal position in real-world situations. If the original document is warped, for example, multi-region sampling provides a mean focal plane, which will put more or all of the document within the optical system's depth of focus.

In step 226, the quality of data for each scan-line capture is analyzed by the system controller 156. This analysis is to determine whether the scan-line data is descriptive or indicative of a focal position. Generally, when the data is from an image with a low contrast in the analysis regions 170, 172, there is less detail against which to judge the quality of the focus. Alternatively, when sufficient detail exists, the optimum focal position can be judged with good accuracy.

In the preferred embodiment, focus quality for each scan-line is calculated by the square of the difference between adjacent pixels.

$$\text{Focus quality} = (p2-p1)^2 + (p3-p2)^2 + \ldots + (pn-pn-1)^2;$$

where p is the value of a pixel and n is the number of the pixel in the analysis region. The basic principle on which auto focus relies is that the digital image data can be analyzed to determine the sharpness of the image details, and this sharpness is maximized when the image is in focus. Because sharpness is relative, any image can be used, although there must be some contrast variation. A totally black image, for example, would not provide sufficient information for focus adjustment.

Figure 7A:
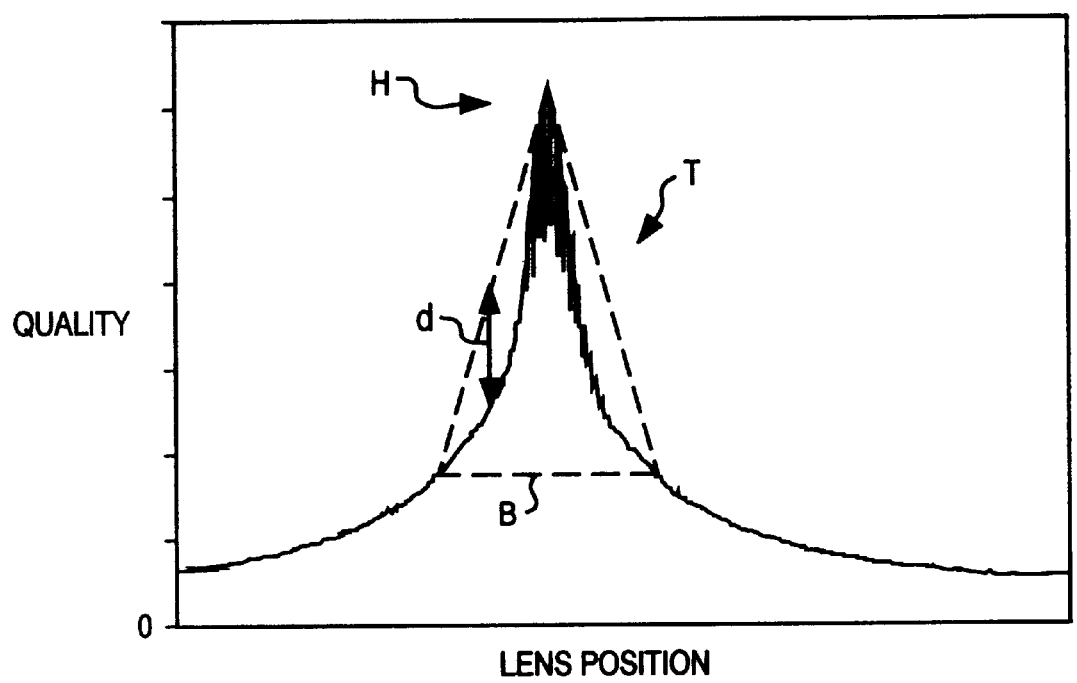
FIGS. 7A and 7B are plots of focus quality as a function of image lens position for high and low contrast images, respectively.

FIG. 7A is a plot showing the focus quality versus lens position for a high contrast image with data set that is strongly indicative of an optimum focus quality. Specifically, a peak occurs at approximately a position of 364 mils.

Figure 7B:
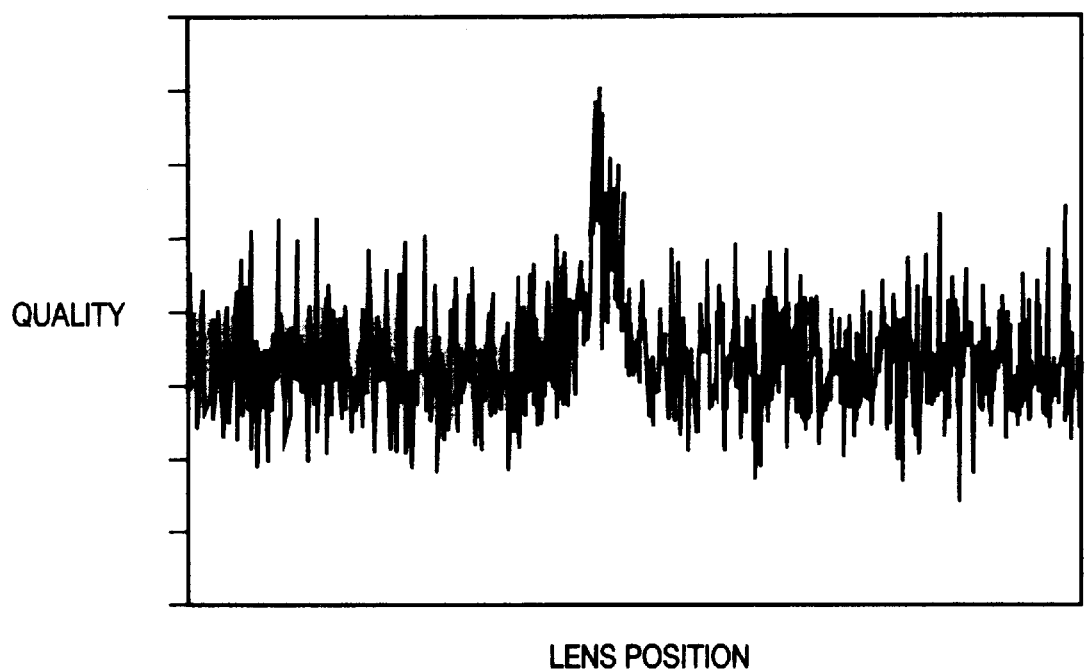

FIG. 7B shows focus quality as a function of lens position for a low contrast image. A peak, however, is perceivable at approximately a lens position of 400 mils.

In the preferred embodiment, focus quality is determined for each of the three, primary colors. Some images will show better contrast in a particular color. For example, the data set for the green data will not be indicative of good focus quality if there are no changes in the level of green in the analysis regions.

In the embodiment of FIG. 3B, any of the data sets for the various colors that show acceptable levels of contrast are used. The other data sets dropped in step 228.

As shown in FIG. 7A, the quality of the data is assessed based on a number of factors. The expected shape is similar to that of a sharply peaked wave, with the peak in the area of best focus. The width of the peak is measured at the halfway point from top to bottom to see if this matches minimum and maximum width expectations based on what is typical for the system. If the width falls within these guidelines, then the top half of the peak is compared to an isosceles triangle T whose base B is the width measured at half height and whose height is equal to the highest value H in the curve. If the top half of the peak has the approximate shape of a triangle, the data is judged to be of sufficient quality. The intention of these guidelines is to identify data that would result in an invalid focus position.

In step 330, it is determined whether or not all the data sets have been dropped.

If all data sets have been dropped, then the imaging optics is set based upon the stored best focus from the factory calibration. Essentially, the scans were not able to determine the best focus position. In this instance, the factory set best focus position is used as the focal position for the lens in step 332. Other default focus positions could be used if desired. For instance, the best focus position could be estimated by examining a different scan line (i.e. by looping back to step 216).

If some of the data sets were acceptable, the location of the best focus setting is calculated for each analysis region 170, 172. In the preferred embodiment, the focus setting is the position of the focusing lens 160. Alternatively, the image detector could be moved relative to the focal position of the imaging optics, or the position of the relay optics could be adjusted. In either of these cases, the best focus setting is then found by averaging the best focus found from each region in step 336.

The best focus position is dependent on the particular color used. The refractive index for the lens 160 is color dependent. The system controller in step 338 calculates a combined best focus position. This calculation incorporates information concerning colors used to calculate best focus.

Once the best focus position is calculated, the lens 160 is moved to the combined best focus position in step 340 for the final scan.

In alternative embodiments, only one color such as green can be used for focus quality calculations. Alternatively, a luminance value can be used which is a weighted average of red, green and blue. Alternatively, one color (e.g. green) data can be used and if there is a lack of information in the green data, then a second color (e.g. red) is used.

While this invention has been particularly shown and described with references to preferred embodiments thereof, it will be understood by those skilled in the art that various changes in form and detail may be made therein without departing from the spirit and scope of the invention as defined by the appended claims. For example, rather than adjusting the focusing lens, the position of the image detector relative to the imaging optics could be adjusted, or the position of the relay optics could be adjusted.

What is claimed is:

1. An image-scanning device having an autofocus capability, the device comprising:

an image detector that generates image data;

imaging optics that forms an image on the image detector;

relay optics that picks-off an image of a region from media being scanned;

focus actuator that adjusts a focal position of the imaging optics relative to the image detector; and a control system that modulates the focus actuator based on the image data from multiple region image captures and for each primary color.

2. An image-scanning device as described in claim 1, wherein the control system prepares image detector electronics for a scan and then performs the multiple region image captures.

3. An image-scanning device as described in claim 1, further comprising a carriage, which carries the image detector and imaging optics, and which the control system moves to a predetermined position prior to performing the multiple image captures of the same region.

4. An image-scanning device as described in claim 1, wherein the control system analyzes the image data to determine whether it is indicative of a focus position prior to the calculation of a focus position location.

5. An image-scanning device having an autofocus capability, the device comprising:

an image detector that generates image data;

imaging optics that forms an image on the image detector;

relay optics that picks-off an image of a region from media being scanned;

focus actuator that adjusts a focal position of the imaging optics relative to the image detector; and a control system that modulates the focus actuator based on the image data from multiple region image captures and retrieves a stored best focus position and adjusts the focus actuator to move the imaging optics to the stored best focus position when the image data is not indicative of a best focus position.

6. An imaging-scanning device as described in claim 5, wherein the control system controls the focus actuator in response to image data for three separate colors.

7. An imaging-scanning device as described in claim 5, wherein the control system controls the focus actuator in response to image data for a color giving rise to image data that is most descriptive of focus position.

8. An image-scanning device having an autofocus capability, the device comprising:

an image detector that generates image data;

imaging optics that forms an image on the image detector;

relay optics that picks-off an image of a region from media being scanned;

focus actuator that adjusts a focal position of the imaging optics relative to the image detector; and a control system that modulates the focus actuator based on the image data from multiple region image captures and corrects for magnification changes caused by adjustment in the focal position of the imaging optics between separate scan-line image captures.

9. An image-scanning device having an autofocus capability, the device comprising:

an image detector that generates image data;

imaging optics that forms an image on the image detector;

relay optics that picks-off an image of a region from media being scanned;

focus actuator that adjusts a focal position of the imaging optics relative to the image detector; and a control system that modulates the focus actuator based on the image data from multiple region image captures and identifies image data groups from multiple analysis regions of the scanned images to correct for magnification changes caused by adjustment in the focal position of the imaging optics between separate scan-line image captures and calculates a best focus based on the image data groups.

10. An image-scanning device having an autofocus capability, the device comprising:

an image detector that generates image data;

imaging optics that forms an image on the image detector;

relay optics that picks-off an image of a region from media being scanned;

focus actuator that adjusts a focal position of the imaging optics relative to the image detector; and a control system that modulates the focus actuator based on the image data from multiple region image captures and controls the focus actuator in response to all colors for a subsequent scanning operation based on image data from less than all colors.

11. An autofocus process for imaging optics of an image acquisition device, the process comprising:

performing multiple image captures of sections of a document to be imaged;

adjusting a focal position of imaging optics, which forms an image, relative to an image detector in between the multiple image captures of image data from the image detector; and calculating a focus setting for a subsequent imaging operation based on the image data from the multiple image captures by calculating a best combined focus for all colors based on image data from less than all colors.

12. An autofocus process for imaging optics of an image acquisition device, the process comprising:

performing multiple image captures of sections of a document to be imaged;

adjusting a focal position of imaging optics, which forms an image, relative to an image detector in between the multiple image captures of image data from the image detector; and calculating a focus setting for a subsequent imaging operation based on the image data from different image data groups corresponding to a common analysis region of an image section to correct for magnification changes caused by adjustment in the focal position of the imaging optics between separate captures of image sections.

* * * * *